(12) United States Patent
Yu

(10) Patent No.: US 11,385,692 B2
(45) Date of Patent: Jul. 12, 2022

(54) REMOTE AUTOMATIC CONTROL POWER SUPPLY SYSTEM

(71) Applicant: Chao-Cheng Yu, Taoyuan (TW)

(72) Inventor: Chao-Cheng Yu, Taoyuan (TW)

( * ) Notice: Subject to any disclaimer, the term of this patent is extended or adjusted under 35 U.S.C. 154(b) by 296 days.

(21) Appl. No.: 16/697,262

(22) Filed: Nov. 27, 2019

(65) Prior Publication Data

US 2021/0157377 A1 May 27, 2021

(51) Int. Cl.
*G06F 1/26* (2006.01)
*H02J 13/00* (2006.01)
*G05B 15/02* (2006.01)
*H02J 4/00* (2006.01)

(52) U.S. Cl.
CPC ............... *G06F 1/26* (2013.01); *G05B 15/02* (2013.01); *H02J 4/00* (2013.01); *H02J 13/00001* (2020.01); *H02J 13/00022* (2020.01)

(58) Field of Classification Search
CPC ............ H02J 13/00001; H02J 13/0005; Y04S 20/242; Y04S 40/128; G06F 1/26; G05B 15/02
See application file for complete search history.

(56) References Cited

U.S. PATENT DOCUMENTS

| | | | | |
|---|---|---|---|---|
| 6,158,000 A * | 12/2000 | Collins | ................. | G06F 9/4405 712/21 |
| 8,536,998 B1 * | 9/2013 | Siu | ...................... | H04L 12/2829 340/538 |
| 9,705,330 B1 * | 7/2017 | Yetter | ..................... | G06Q 50/06 |
| 10,616,713 B1 * | 4/2020 | Yu | ............................ | H04L 67/18 |
| 11,018,510 B2 * | 5/2021 | Wootton | .................. | H02J 13/00 |
| 2005/0240789 A1 * | 10/2005 | Saito | ......................... | G06F 1/24 713/340 |
| 2009/0010178 A1 * | 1/2009 | Tekippe | ................. | H04W 88/10 370/254 |
| 2014/0245160 A1 * | 8/2014 | Bauer | ..................... | H04L 41/22 715/736 |
| 2015/0198938 A1 * | 7/2015 | Steele | ..................... | G05B 15/02 700/275 |
| 2015/0293568 A1 * | 10/2015 | Ghesquiere | ........... | G06F 1/3237 713/324 |
| 2016/0285310 A1 * | 9/2016 | Tan | ....................... | G01R 22/068 |
| 2017/0070090 A1 * | 3/2017 | Miller | ................ | H01R 13/6683 |
| 2017/0146969 A1 * | 5/2017 | Yamada | ................ | H04L 12/413 |
| 2017/0238133 A1 * | 8/2017 | Partheesh | ......... | H04M 1/72457 455/456.1 |

(Continued)

*Primary Examiner* — Vincent H Tran
(74) *Attorney, Agent, or Firm* — WPAT, PC

(57) ABSTRACT

A remote automatic control power supply system is disclosed, comprising a power supply control device and an electronic device having a control circuit, in which the power supply control device is configured to control whether the power supply is to be outputted, and the control circuit can set the GPS coordinate and the starting distance value close to the power supply control device; afterwards, it is possible to operate the control circuit via the backend of the electronic device such that, when the distance between the real-time GPS coordinate of the electronic device and the GPS coordinate of the power supply control device is equivalent to the starting distance value, the control circuit can transmit a power control signal to the power supply control device thereby allowing the power supplying control device to output the electric power to the receiving end.

9 Claims, 14 Drawing Sheets

(56) References Cited

U.S. PATENT DOCUMENTS

| | | | |
|---|---|---|---|
| 2017/0344042 A9* | 11/2017 | Davis | H04W 84/18 |
| 2018/0348718 A1* | 12/2018 | Richardson | H04L 12/2829 |
| 2019/0027963 A1* | 1/2019 | Parks | H04B 7/15507 |
| 2019/0181638 A1* | 6/2019 | Chapel | H02J 13/00004 |
| 2019/0208266 A1* | 7/2019 | Hsueh | H04B 5/00 |
| 2019/0281408 A1* | 9/2019 | Zhao | H04W 4/021 |
| 2020/0107086 A1* | 4/2020 | Choueiter | G06N 5/046 |
| 2021/0270876 A1* | 9/2021 | Siau | H02J 13/0005 |

* cited by examiner

REMOTE AUTOMATIC CONTROL POWER SUPPLY SYSTEM

BACKGROUND OF THE INVENTION

1. Field of the Invention

The present invention generally relates to a remote automatic control power supply system; in particular, it concerns a remote automatic control power supply system which is capable of setting the starting distance between a target object and a mobile device by means of GPS coordinates, and once the starting distance condition is satisfied, the power supply control device thereof can perform automatic power on or automatic power off with respect to the connected target object, thereby enabling the feature of remote automatic detection distance in order to achieve the goal of automatic power on or automatic power off.

2. Description of Related Art

With the advancement of technologies, various smart home appliances have gradually been accepted by people, and, particularly, the smart power switch is currently a major development focus. At present, these types of smart switches mostly connect the power switch to the urban power and home appliances (e.g., electric fans, lamps, etc.), and then wirelessly connect and operate the power switch by way of the mobile electronic device preloaded with the mobile application so as to wirelessly control the on and off states in the power switch.

However, the above-said approach still requires the user to manually start or turn on/off the target object, so, from this aspect, it is merely to manually start the home appliance (such as a fan, a light, etc.) at a remote end. If it is possible to set to automatically determine the distance between the user and the home appliance, and control the power-on or power-off states of the home appliance according to the distance, then such operations can helpfully save the user's operation time, and the automatic power on/off feature also additionally allows to prevent excessively continuous operations of the home appliances due to leaving home or negligently forgetting, so this application can be an optimal solution for resolving these issues.

SUMMARY OF THE INVENTION

The remote automatic control power supply system according to the present invention comprises: a power supply control device, capable of receiving a power control signal and, based on the contents of the power control signal, controlling the power output to a receiving end; an electronic device, including one or more processors, a memory, a display screen, a network connector, a Global Positioning System (GPS) locator and a controller, wherein the memory is used to store the controller-executable instructions, and the processor can operate the controller to execute such instructions, and the controller includes: an interface management module, used to provide multiple operation interfaces shown on the display screen; an environmental space coordinate acquisition module, capable of obtaining the GPS coordinate values of the electronic device at any position in the environmental space by means of the GPS locator, and defining the GPS coordinate values as a target positioning coordinate; a time acquisition module, capable of connecting to the Internet through the network connector in order to obtain the time data of the electronic device at any position in the environment space, and defining the time data as a target positioning time; a distance setting module, used for configuring at least one group of starting distance values; a configuration file creation module, connected to the environmental space coordinate acquisition module and the distance setting module, and used for establishing and storing the target positioning coordinate, the target positioning time and the starting distance value as a power supply control configuration file; a real-time coordinate acquisition module, configured to obtain the real-time GPS coordinate values of the electronic device by means of the GPS locator, and defining the real-time GPS coordinate values as a mobile positioning coordinate; a distance conversion module, connected to the configuration file creation module and the real-time coordinate acquisition module for calculating and comparing the mobile positioning coordinate and the target positioning coordinate in order to generate a real-time distance value; and a determining module, connected to the configuration file creation module and the distance converting module for comparing the starting distance value with the real-time distance value, and if the real-time distance value is determined to be equal to the starting distance value, the power control signal will be transmitted via the network connector; and, a telecommunication network device, capable of connecting to the power supply control device, wherein the telecommunication network device can receive the power control signal transmitted by the network connector of the electronic device, and then the received power control signal is transmitted to the power supply control device by the telecommunication network device.

In a preferred embodiment, the power supply control device includes: a central processing circuit, used for controlling the overall operation mechanism of the power supply control device; a power input circuit, used for receiving an input power; a power output circuit, used for outputting an output power to the receiving end; a control circuit, connected to the central processing circuit, the power input circuit and the power output circuit for driving the control circuit to operate through the central processing circuit, such that the input power received by the power input circuit can be outputted to the power output circuit thereby allowing the power output circuit to provide the receiving end with the output power; a wireless network connection circuit, connected to the central processing circuit for transmitting signals in a wireless network connection manner so that the wireless network connection circuit has a wireless transmission function, wherein the wireless network connection circuit is further capable of receiving a power control signal and transmitting the received power control signal to the central processing circuit such that the central processing circuit can control and decide whether the power output circuit can output power based on the contents of the power control signal.

In a preferred embodiment, the power control device further includes a reset circuit which is electrically connected to the central processing circuit and configured to provide a reset signal to the central processing circuit when the power is turned back on.

In a preferred embodiment, the power supply control device further includes a power output indicator electrically connected to the central processing circuit for controlling the power output indicator to illuminate for display, after the central processing circuit controls the AC power output circuit to output the AC power to the receiving end.

In a preferred embodiment, the power supply control device further includes a network connection indicator electrically connected to the central processing circuit, wherein the central processing circuit can control the network connection indicator to illuminate for display when the wireless network connection circuit is performing network connection operations.

In a preferred embodiment, the power supply control device further includes a press controller which is electrically connected to the central processing circuit and configured to allow press-down actions in order to control the AC power output circuit whether the AC power can be outputted to the receiving end.

In a preferred embodiment, the network connector can operate in a mobile network mode or a wireless network mode.

In a preferred embodiment, the power supply control device has a control identification code which is stored in the power supply control configuration file such that the control circuit of the electronic device can transmit the power control signal based on different control identification codes.

In a preferred embodiment, the receiving end can be an electronic product allowable to be connected to the power supply control device, and the power supply control device can provide the electronic product with electric power thereby controlling the operations of the electronic product.

In a preferred embodiment, the receiving end can be an electronic product, and the power supply control device can be installed within the receiving end so that electric power can be supplied to the electronic product through the power supply control device thereby controlling the operations of the electronic product.

In a preferred embodiment, the power supply control device can provide the receiving end with DC power or AC power.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

Figure 1:
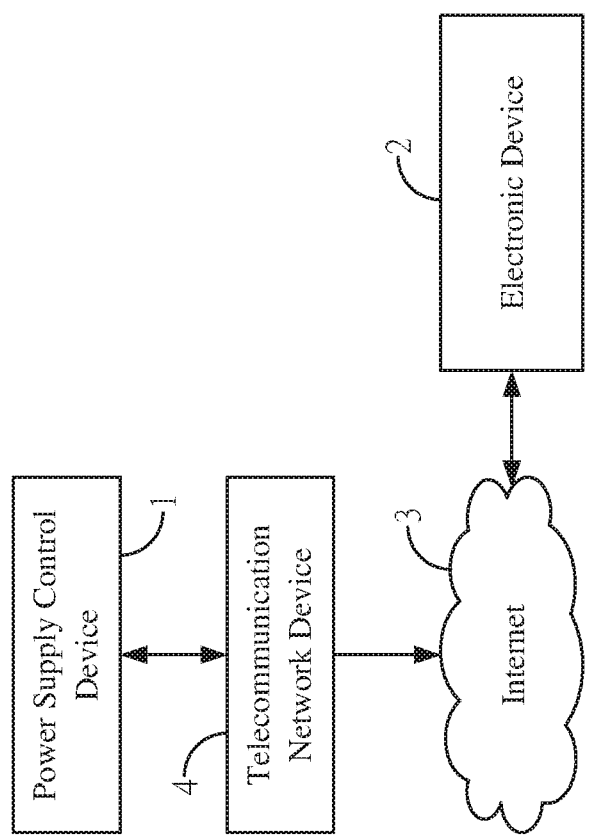
FIG. 1 shows an overall architecture diagram for the remote automatic control power supply system according to the present invention.

Refer first to FIG. 1, wherein the illustrated remote automatic control power supply system according to the present invention comprises a power supply control device 1 and an electronic device 2. Herein the power supply control device 1 can be enabled 1 to connect to the Internet 3 by way of a telecommunication network device 4 (e.g. a router), and the power control signal transmitted by the electronic device 2 can be sent to the power supply control device 1.

Figure 2:
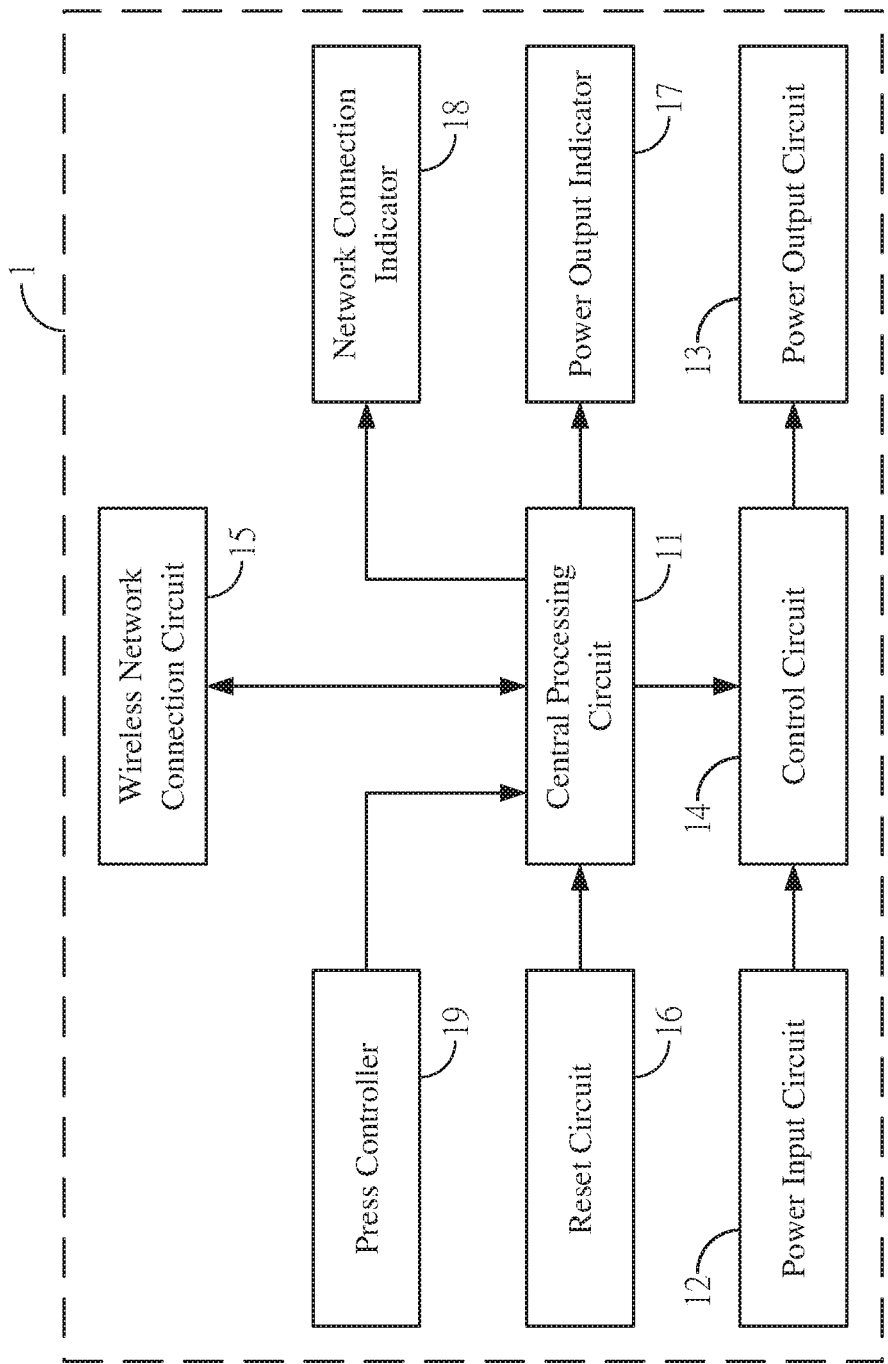
FIG. 2 shows an architecture diagram for the power supply control device in the remote automatic control power supply system according to the present invention.

Also, as shown in FIG. 2, the power supply control device 1 includes the following items:

(1) a central processing circuit 11, used for controlling the overall operation mechanism of the power supply control device 1;

(2) a power input circuit 12, used for receiving an input power;

(3) a power output circuit 13, used for outputting an output power to a receiving end;

(4) a control circuit 14, used for driving the control circuit 14 to operate via the central processing circuit 11, such that the input power received by the power input circuit 12 can be outputted to the power output circuit 13 thereby allowing the power output circuit 13 to provide the receiving end with the output power.

(5) a wireless network connection circuit 15, used for transmitting signals in a wireless network connection manner (e.g., WiFi) so that the wireless network connection circuit 15 has a wireless transmission function, wherein the wireless network connection circuit 15 is further capable of receiving a power control signal and transmitting the received power control signal to the central processing circuit 11 such that the central processing circuit 11 can control and decide whether the power output circuit 13 can output power based on the contents of the power control signal;

(6) a reset circuit 16, used for, upon repowering, providing the reset signal to the central processing circuit 11;

(7) a power output indicator 17, used for controlling the power output indicator 17 to illuminate for display, after the central processing circuit 11 controls the AC power output circuit 122 to output the AC power to the receiving end;

(8) a network connection indicator 18, used for allowing the central processing circuit 11 to control the network connection indicator 18 to illuminate for display when the wireless network connection circuit 15 is performing network connection operations;

(9) a press controller 19, used for enabling the press-down action in order to control the AC power output circuit 122 with respect to whether the AC power can be outputted to the receiving end.

Figure 3A:
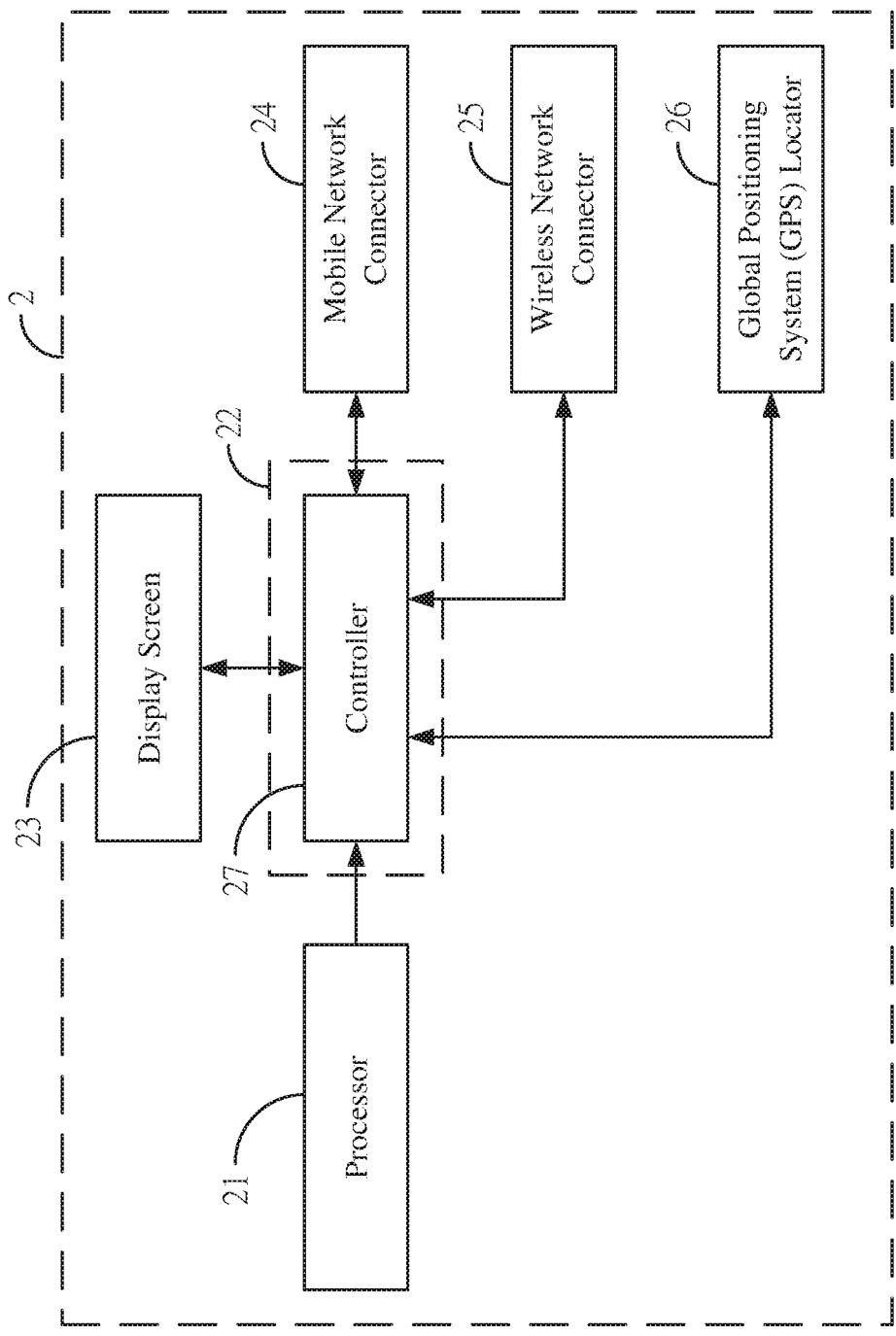
FIG. 3A shows an architecture diagram for the electronic device in the remote automatic control power supply system according to the present invention.
Figure 3B:
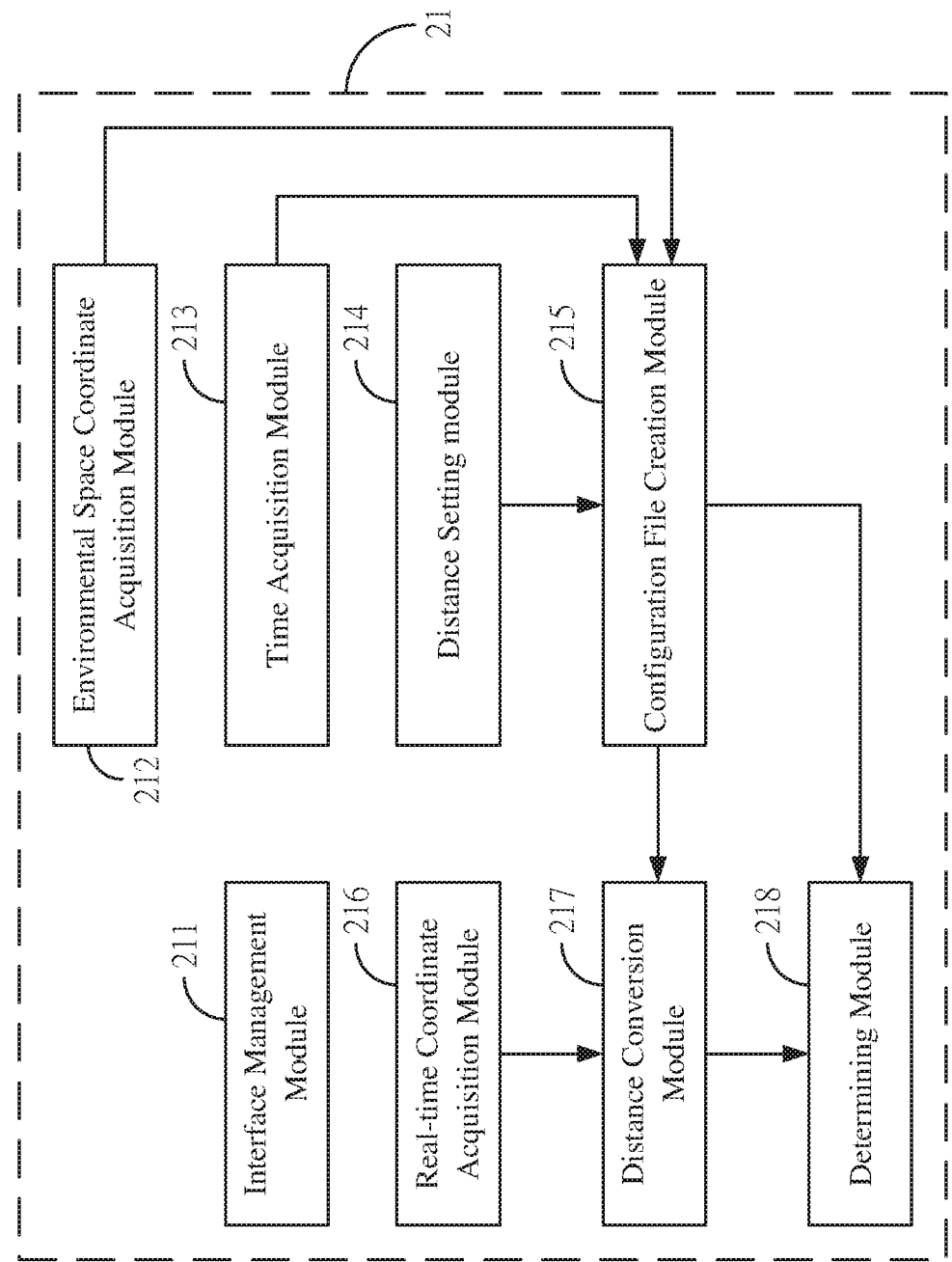
FIG. 3B shows an architecture diagram for the control circuit in the remote automatic control power supply system according to the present invention.

As shown in FIGS. 3A and 3B, the electronic device 2 includes one or more processors 21, a memory 22, a display screen 23, a network connector (i.e., the mobile network connector 24 and the wireless network connector 25 as illustrated in the Figures), a GPS locator 26 and a controller 27, wherein the memory 22 is configured to store the executable instructions for the controller 27 of, and the processor 21 can operate the controller 27 to execute such instructions.

Besides, the display screen 23 can display a screen, the mobile network connector 22 provides the mobile data network function, and the wireless network connector 23 is used for external wireless network connections; also, the GPS locator 24 is configured to enable the electronic device 2 to perform GPS coordinate positioning function.

In particular, the controller 27 includes:

(1) an interface management module 211, used to provide multiple operation interfaces shown on the display screen 23;

(2) an environmental space coordinate acquisition module 212, capable of obtaining the GPS coordinate values of the electronic device 2 at any position in the environmental space 1 by means of the GPS locator 26, and defining the GPS coordinate values as a target positioning coordinate;

(3) a time acquisition module 213, capable of connecting to the Internet 3 through the network connector (i.e., the mobile network connector 24 and the wireless network connector 25) in order to obtain the time data of the electronic device 2 at any position in the environment space 1, and defining the time data as a target positioning time;

(4) a distance setting module 214, used for configuring at least one group of starting distance values;

(5) a configuration file creation module 215, connected to the environmental space coordinate acquisition module and the distance setting module, and used for establishing and storing the target positioning coordinate, the target positioning time and the starting distance value as a power supply control configuration file;

(6) a real-time coordinate acquisition module 216, configured to obtain the real-time GPS coordinate values of the electronic device 2 by means of the GPS locator 26, and defining the real-time GPS coordinate values as a mobile positioning coordinate;

(7) a distance conversion module 217, connected to the configuration file creation module and the real-time coordinate acquisition module for calculating and comparing the mobile positioning coordinate and the target positioning coordinate in order to generate a real-time distance value; and (8) a determining module 218, connected to the configuration file creation module and the distance converting module for comparing the starting distance value with the real-time distance value, and if the real-time distance value is determined to be equal to the starting distance value, the power control signal will be transmitted via the network connector; moreover, the power supply control device 1 has a control identification code which is stored in the power supply control configuration file such that the controller 27 of the electronic device 2 can transmit the power control signal based on different control identification codes by way of the network connector (that is, the mobile network connector 24 and the wireless network connector 25).

It can be seen that the environmental space acquisition module 212 and the time acquisition module 213 can be connected to the Internet 3 via the mobile network connector 22/wireless network connector 23 so as to obtain the GPS coordinate values and the current time of the electronic device 2 at that specific moment; and, in addition to the network, it is also possible to acquire the GPS coordinate values of the electronic device 2 directly through the GPS locator 24.

Figure 4A:
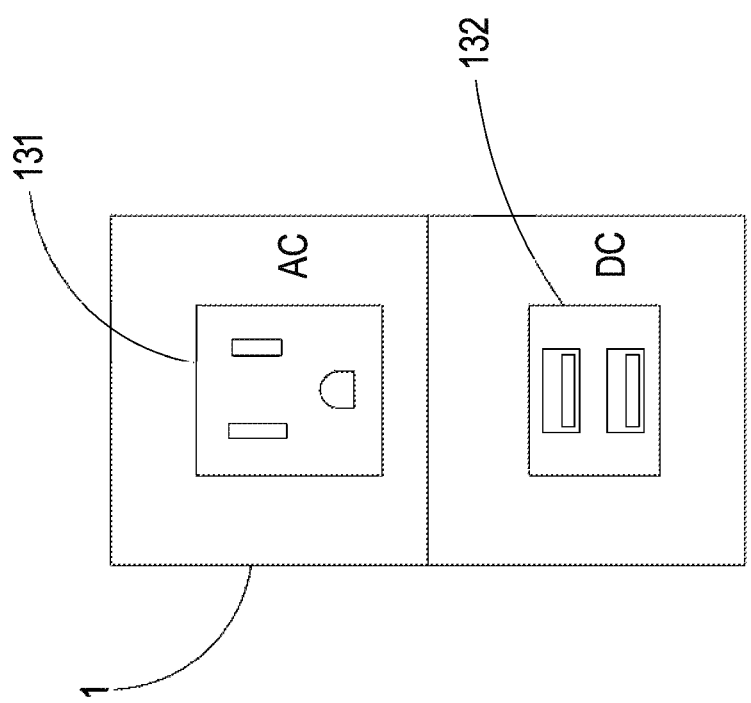
FIG. 4A shows a diagram for the external power supply control device in the remote automatic control power supply system according to the present invention.
Figure 4B:
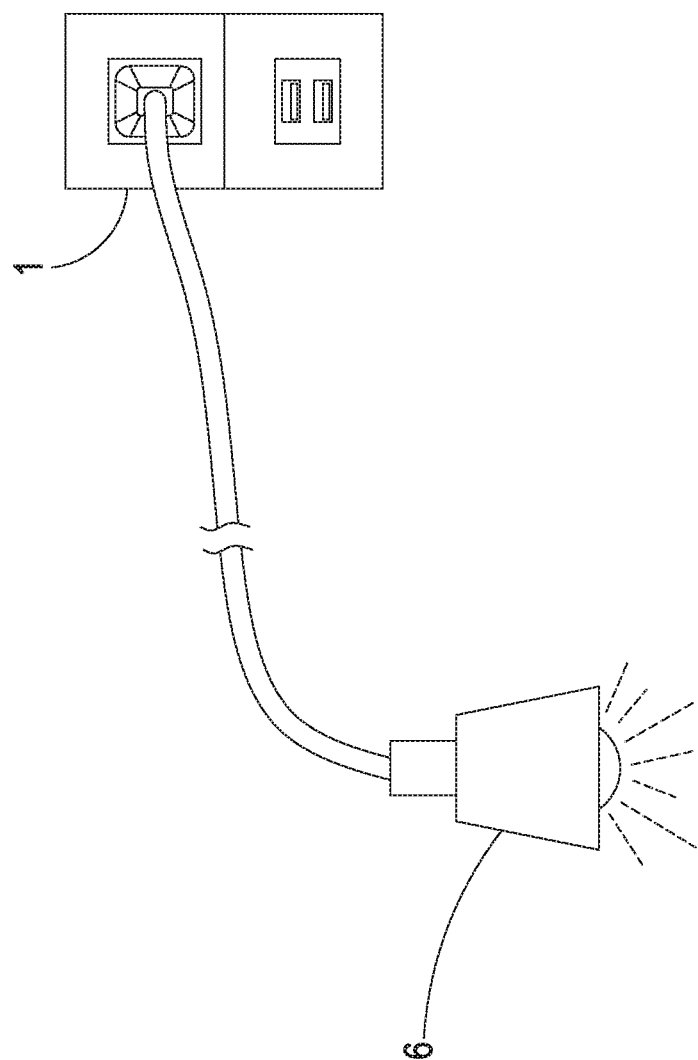
FIG. 4B shows an application embodiment diagram for the external power supply control device in the remote automatic control power supply system according to the present invention.
Figure 4C:
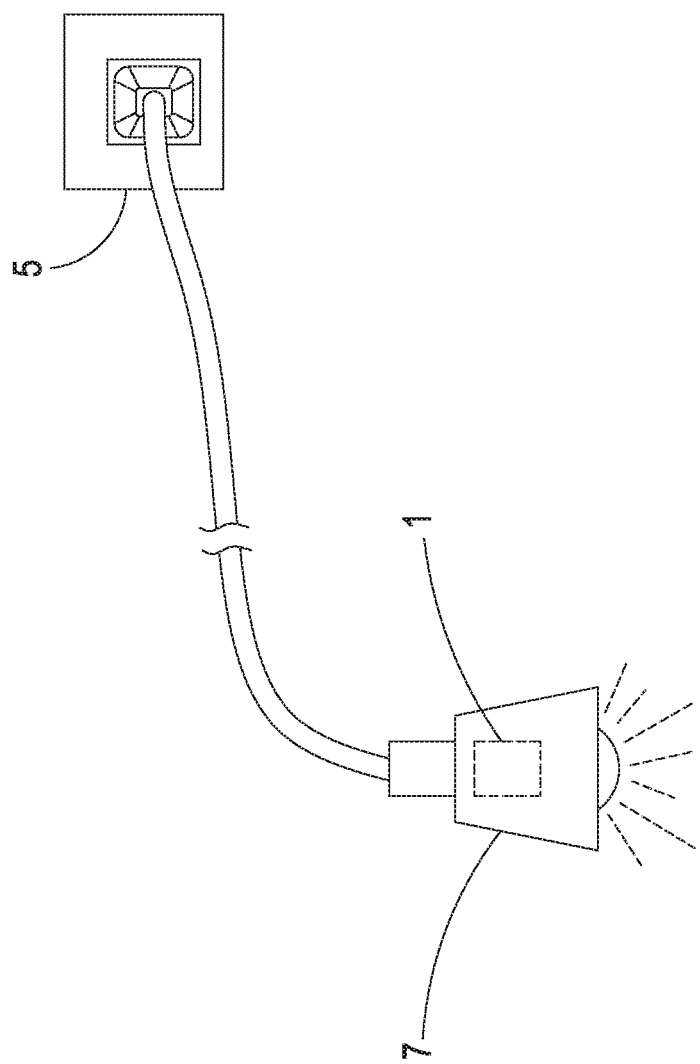
FIG. 4C shows an application embodiment diagram for the internal power supply control device in the remote automatic control power supply system according to the present invention.

The configuration relationship between the power supply control device 1 and the receiving end in the present embodiment can be further explained as below:

(1) the receiving end may be an electronic product which can be connected to the power supply control device 1 as shown in FIGS. 4A and 4B, and the power supply control device 1 has an AC (Alternative Current) power supply jack 131 and a DC (Direct Current) power supply jack 132 (e.g., a USB jack), and the receiving end 6 allows to insert a power cord into the AC power supply jack 131 of the power supply control device 1 in order to let the power supply control device 1 control whether the AC power source is to be outputted to the receiving end 6 thereby controlling the operations of the receiving end 6 (i.e., the electronic product);

(2) or, alternatively, the receiving end may be an electronic product as shown in FIG. 4C and the power supply control device 1 can be disposed inside the receiving end 7, in which one end of the power supply control device 1 is electrically connected to a socket 5 through a power line, while the other end of the power supply control device 1 can be connected to the receiving end 7 so as to allow the power supply control device 1 to provide the electronic device with electric power, thus controlling the operations of the electronic product.

Figure 5:
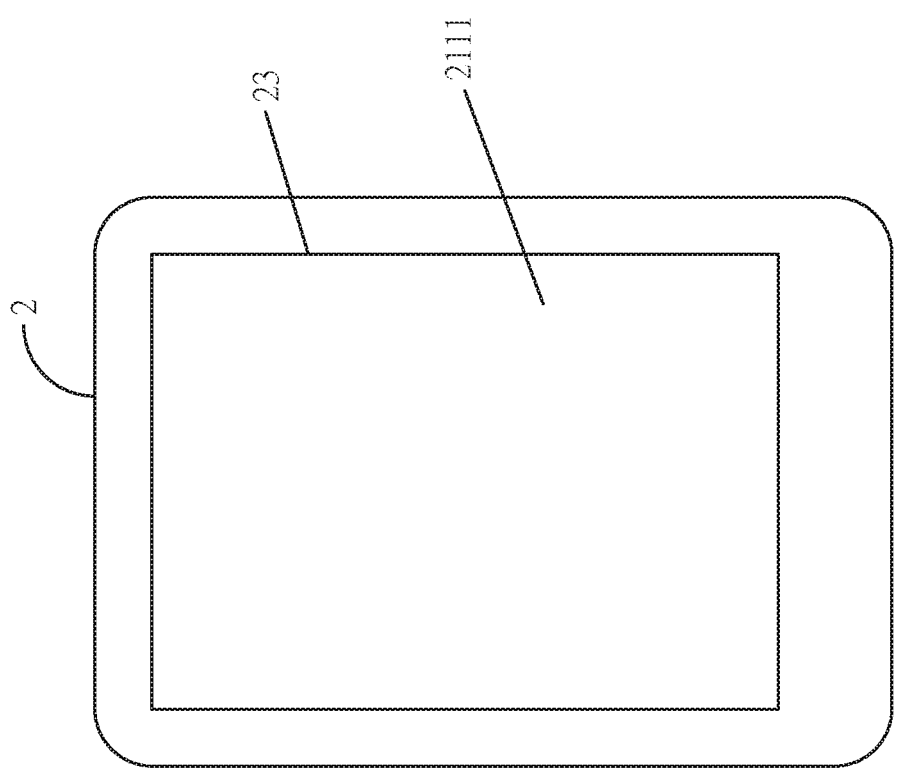
FIG. 5 shows a diagram for the display interface of the electronic device in the remote automatic control power supply system according to the present invention.
Figure 6A:
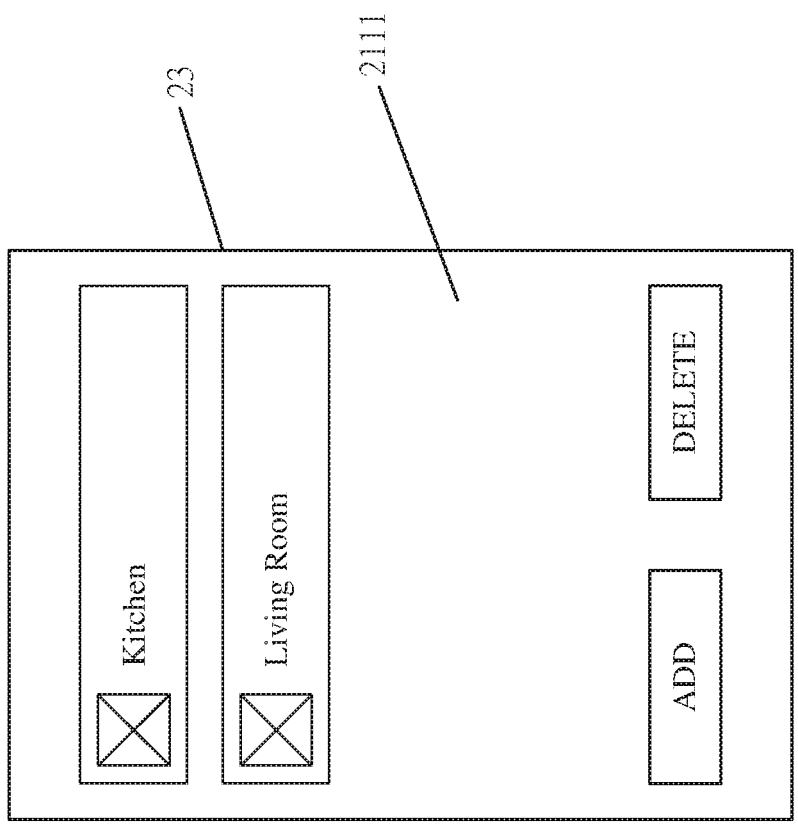
FIG. 6A shows an operation embodiment diagram for the remote automatic control power supply system according to the present invention.

Also, as shown in FIGS. 5 and 6A, the display screen 23 can display an operation interface 2111, and the user can press down an option, e.g., "Kitchen" or "Living Room", to configure wherein the "Kitchen" or "Living Room" is preset to represent the power supply control device 1 installed in the kitchen or in the living room, and, in FIG. 6A, it can be seen that it is possible to add different power supply control devices 1 located at different positions for setting up.

Furthermore, the power supply control device 1 must first be paired with the controller 27 of the electronic device 2 (various pairing methods can be applied, for example, the mobile phone is first connected to the power supply control device 1 for connection and then required to input account and password by means of the NFC pairing to enter the account and password; but it should be understood that the applicable pairing or matching methods for the present invention are not limited to the above-said contents, meaning any suitable approaches concerning the pairing process to enter the account and password all fall within the scope of protection claimed by the present invention.) Subsequently, after selecting the telecommunication network device 4 to be connected to, the account and password of the telecommunication network device 4 can be inputted to the power supply control device 1 through the controller 27 and stored therein, so that the power supply control device 1 can spontaneously and automatically link itself to a corresponding telecommunication network device 4.

Figure 6B:
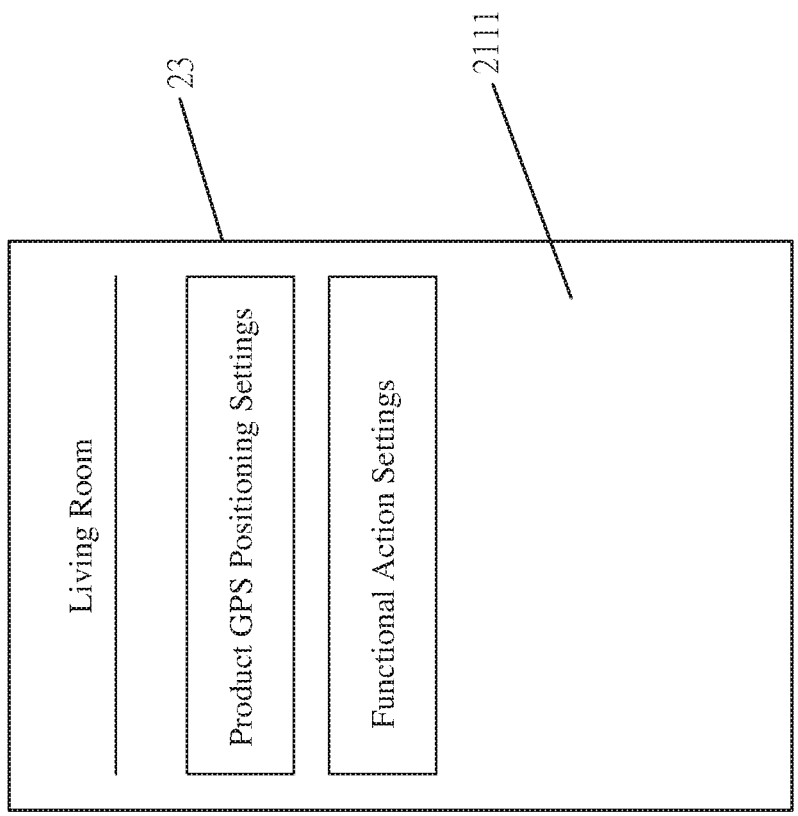
FIG. 6B shows an operation embodiment diagram for the remote automatic control power supply system according to the present invention.
Figure 6C:
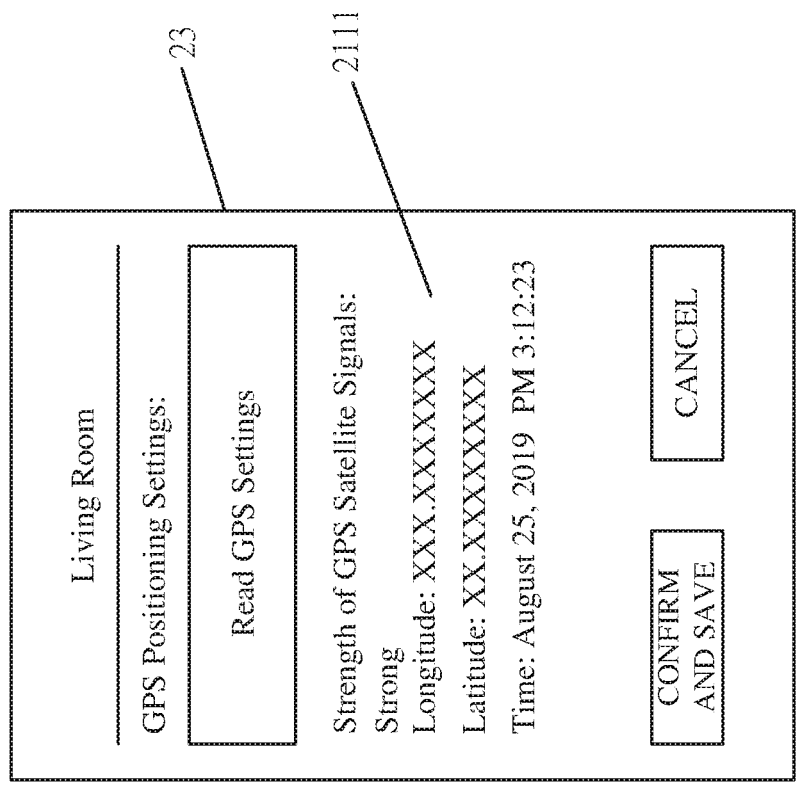
FIG. 6C shows an operation embodiment diagram for the remote automatic control power supply system according to the present invention.
Figure 6D:
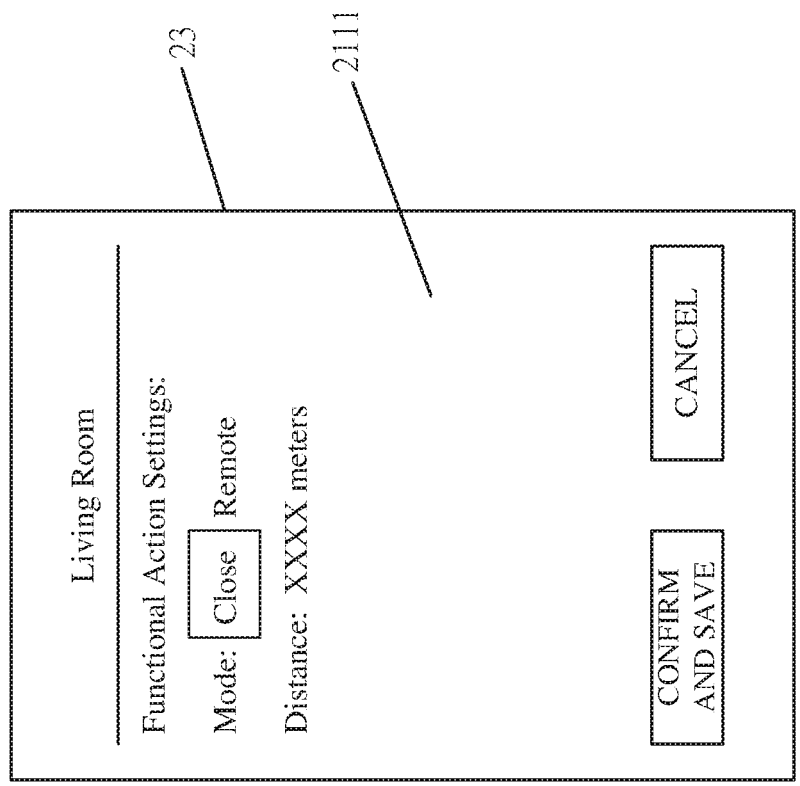
FIG. 6D shows an operation embodiment diagram for the remote automatic control power supply system according to the present invention.

As shown in FIG. 6B, after selecting the "Living Room" option, the "Product GPS Positioning Settings" and "Function Action Settings" options are displayed. If the option "Product GPS Positioning Settings" is selected, as shown in FIG. 6C, it is possible to press down "Read GPS Position" in order to get the GPS coordinates and time; then, after pressing down and saving, it will proceed to FIG. 6D such that the user can choose how close the distance is and/or how far away it is the corresponding power supply control device is to be activated. Finally, after pressing "Confirm for Storage", it can be stored as a power supply control configuration file.

Then, after the electronic device which sets up the power supply control configuration file satisfies the configured distance difference with respect to its distance remote or close thereto, the control circuit operating in the background on the electronic device can now transmit the power control signal to the corresponding power supply control device so that the power supply control device can supply electric power to the receiving end. Therefore, even if the user does not operate manually, when the electronic device approaches or moves away, the configured power supply control device can be automatically activated.

Additionally, the power supply control device can be set to supply power, and can be also set to turn off the power. For example, in case of 500 meters away from the living room, the power supply control device can be automatically driven to stop supplying electric power to the air conditioner; on the other hand, in case of approaching to the living room within 300 meters, the power supply control device can be automatically driven to start supplying electric power to the air conditioner.

Figure 7:
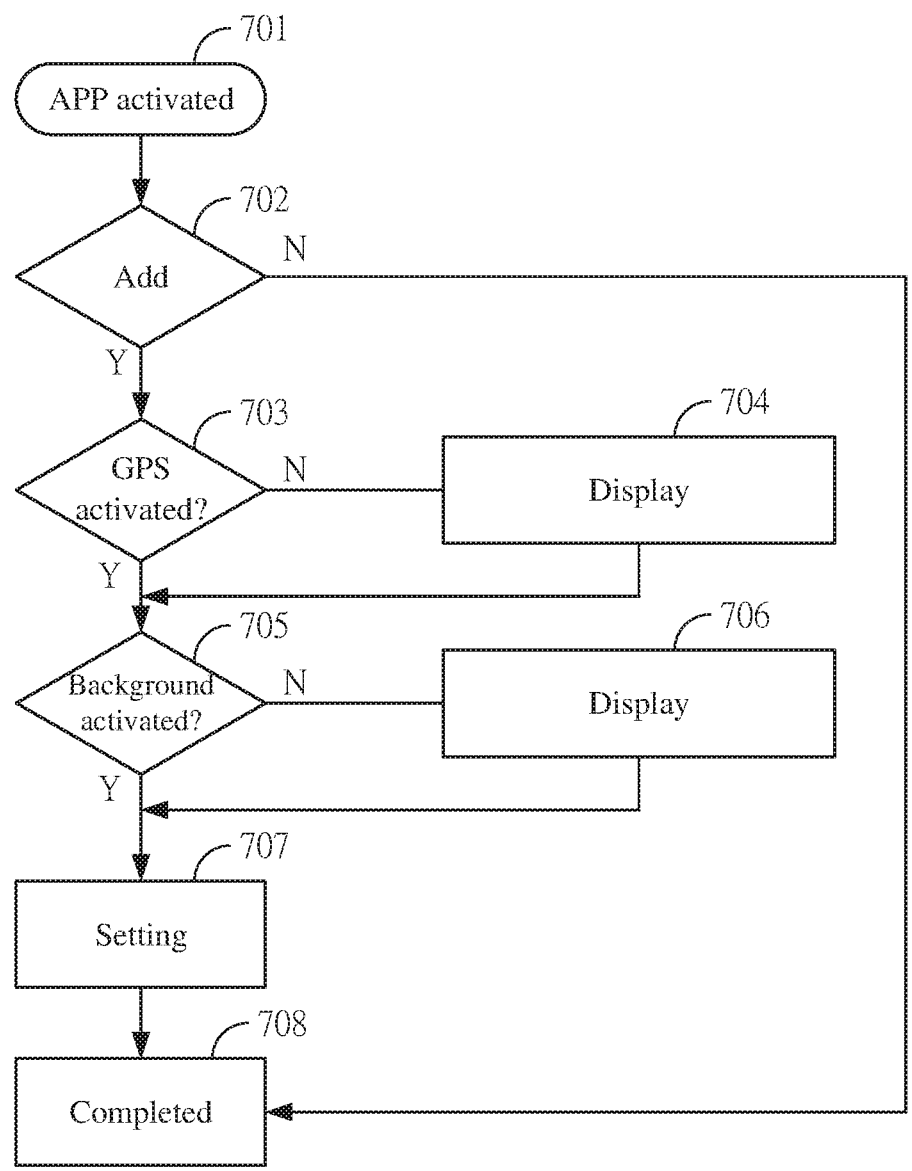
FIG. 7 shows an addition embodiment flowchart for the remote automatic control power supply system according to the present invention.

Next, the steps for adding a GPS function are shown in FIG. 7, explained in details as follows:

(1) Activating the control circuit APP to add a GPS function (701);

(2) Checking whether the new GPS control function is activated (702); if YES, it is further determined whether the GPS function of the electronic device is turned on (703); if it is determined that it is not enabled, then a message "Start GPS function, otherwise this function cannot be performed" will be displayed on the operation interface of the electronic device (704);

(3) however, if it is determined that the GPS function is already enabled, it will further determined whether the control circuit APP can operate in the background on the electronic device (705); if the determination is NO, then a message "Start background execution function, otherwise this function cannot be performed" will be displayed on the operation interface of the electronic device (706);

(4) after finishing all confirmations, the GPS function can be configured as needed (707), thus finally completing the setting process (708).

Figure 8:
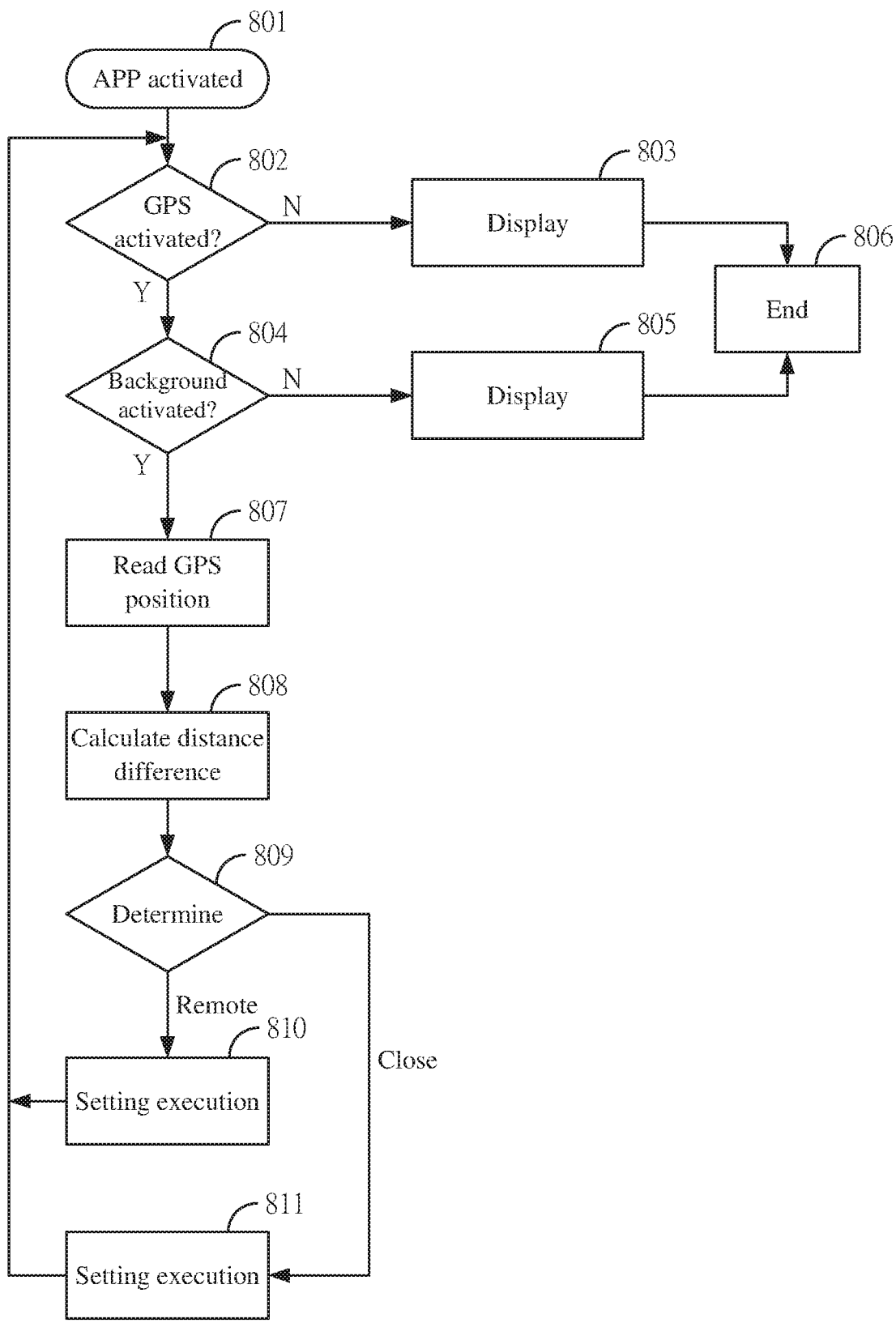
FIG. 8 shows a determination embodiment flowchart for the remote automatic control power supply system according to the present invention.

Meanwhile, the steps for the determination process are shown in FIG. 8, explained in details hereunder:

(1) after the control circuit APP is started (801), it is determined whether the GPS function of the electronic device has been activated (802); if it is determined that it is not activated, a message "Turn on GPS function, otherwise this function cannot be performed" will be displayed on the operation interface of the electronic device (803);

(2) subsequently, it will determine whether the control circuit APP can operate in the background of the electronic device (804); if the determination is NO, then a message "Turn on background execution function, otherwise this function cannot be performed" (805), and, after completing Steps 803 and 805, the setting process will be ended (806);

(3) afterwards, the GPS position of the electronic device will be read (807), thereby recalculating the distance difference between the product position and the APP end (808), and then determining whether the APP is remote or close to the product end (809); if it is determined to be remote, then operations will be performed according to the Remote settings (810); If it is determined to be close, then the operation will be performed according to the Close settings (811);

(4) finally, return to Step (802) and repeat the aforementioned Steps.

It should be appreciated that, although the control circuit of the electronic device can directly transmit the power control signal to the telecommunication network device, it is also possible to apply a cloud servo device (not shown) such that the control circuit of the electronic device first transmits to the cloud server device, and then the cloud server device relays the signal transmission to the telecommunication network device for dispatching to the specified power supply control device.

In comparison with other conventional technologies, the remote automatic control power supply system according to the present invention provides the following advantages:

(1) The present invention can set up and automatically determine the distance between the user and the home appliance, thus controlling the activation or shutdown of the home appliance based on the distance.

(2) In addition to saving the user's manual operation time, the automatic activation and shutdown mechanism provided by the present invention can also prevent unwanted continuous operations of the home appliance due to user's negligence, oblivion or going out.

It should be noticed that, although the present invention has been disclosed through the detailed descriptions of the aforementioned embodiments, such illustrations are by no means used to restrict the scope of the present invention; that is, skilled ones in relevant fields of the present invention can certainly devise any applicable alterations and modifications after having comprehended the aforementioned technical characteristics and embodiments of the present invention within the spirit and scope thereof. Hence, the scope of the present invention to be protected under patent laws should be delineated in accordance with the claims set forth hereunder in the present specification.

What is claimed is:

1. A remote automatic control power supply system, comprising:
   a power supply control device, configured for receiving a power control signal and controlling the power output to a receiving end based on the contents of the power control signal, wherein the power supply control device comprises:
      a central processing circuit, configured for controlling the overall operation mechanism of the power supply control device;
      a power input circuit, configured for receiving an input power;
      a power output circuit, configured for outputting an output power to the receiving end;
      a control circuit, connected to the central processing circuit, the power input circuit, and the power output circuit, the control circuit configured for driving the control circuit to operate through the central processing circuit, such that the input power received by the power input circuit is output to the power output circuit causing the power output circuit to provide the receiving end with the output power; and
      a reset circuit, electrically connected to the central processing circuit and configured to provide a reset signal to reset the central processing circuit when the power is turned back on;
   an electronic device, including one or more processors, a memory, a display screen, a network connector, a Global Positioning System (GPS) locator and a controller, wherein the memory is configured to store the controller-executable instructions, and the processor operates the controller to execute such instructions, and the controller includes:
- an interface management module, configured to provide multiple operation interfaces shown on the display screen;
- an environmental space coordinate acquisition module, configured for obtaining the GPS coordinate values of the electronic device at any position in the environmental space by means of the GPS locator, and defining the GPS coordinate values as a target positioning coordinate;
- a time acquisition module, configured for connecting to an Internet through the network connector in order to obtain the time data of the electronic device at any position in the environment space, and defining the time data as a target positioning time;
- a distance setting module, configured for configuring at least one group of starting distance values;
- a configuration file creation module, connected to the environmental space coordinate acquisition module and the distance setting module, and configured for establishing and storing the target positioning coordinate, the target positioning time and the starting distance value as a power supply control configuration file;
- a real-time coordinate acquisition module, configured to obtain the real-time GPS coordinate values of the electronic device by means of the GPS locator, and defining the real-time GPS coordinate values as a mobile positioning coordinate;
- a distance conversion module, connected to the configuration file creation module and the real-time coordinate acquisition module, configured for calculating and comparing the mobile positioning coordinate and the target positioning coordinate in order to generate a real-time distance value; and
- a determining module, connected to the configuration file creation module and the distance converting module for comparing the starting distance value with the real-time distance value, and if the real-time distance value is determined to be equal to the starting distance value, the power control signal will be transmitted via the network connector; and a telecommunication network device, configured for connecting to the power supply control device, wherein the telecommunication network device can receive the power control signal transmitted by the network connector of the electronic device, the received power control signal is transmitted to the power supply control device by the telecommunication network device.

2. The remote automatic control power supply system according to claim 1, wherein the power supply control device further comprises:
- a wireless network connection circuit, connected to the central processing circuit for transmitting signals in a wireless network connection manner such that the wireless network connection circuit has a wireless transmission function, wherein the wireless network connection circuit is further configured for receiving a power control signal and transmitting the received power control signal to the central processing circuit such that the central processing circuit can control and decide whether the power output circuit can output power based on the contents of the power control signal.

3. The remote automatic control power supply system according to claim 2, wherein the power supply control device further includes a power output indicator electrically connected to the central processing circuit for controlling the power output indicator to illuminate for display, after the central processing circuit controls the AC power output circuit to output the AC power to the receiving end.

4. The remote automatic control power supply system according to claim 2, wherein the power supply control device further includes a network connection indicator electrically connected to the central processing circuit, and the central processing circuit controls the network connection indicator to illuminate for display when the wireless network connection circuit is performing network connection operations.

5. The remote automatic control power supply system according to claim 2, wherein the power supply control device further includes a press controller which is electrically connected to the central processing circuit and configured to allow press-down actions to control the AC power output circuit whether the AC power is output to the receiving end.

6. The remote automatic control power supply system according to claim 1, wherein the power supply control device has a control identification code which is stored in the power supply control configuration file such that the control circuit of the electronic device transmits the power control signal based on different control identification codes.

7. The remote automatic control power supply system according to claim 1, wherein the receiving end is an electronic product allowable to be connected to the power supply control device, and the power supply control device provides the electronic product with electric power thereby controlling the operations of the electronic product.

8. The remote automatic control power supply system according to claim 1, wherein the receiving end can be an electronic product, and the power supply control device can be installed within the receiving end so that electric power is supplied to the electronic product through the power supply control device thereby controlling the operations of the electronic product.

9. The remote automatic control power supply system according to claim 1, wherein the power supply control device provides the receiving end with DC power or AC power.

* * * * *